United States Patent
Oberheide et al.

(10) Patent No.: US 10,063,531 B2
(45) Date of Patent: *Aug. 28, 2018

(54) METHOD FOR KEY ROTATION

(71) Applicant: Duo Security, Inc., Ann Arbor, MI (US)

(72) Inventors: Jon Oberheide, Ann Arbor, MI (US); Adam Goodman, Ann Arbor, MI (US)

(73) Assignee: Duo Security, Inc., Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/685,626

(22) Filed: Aug. 24, 2017

(65) Prior Publication Data

US 2018/0007025 A1 Jan. 4, 2018

Related U.S. Application Data

(63) Continuation of application No. 15/193,533, filed on Jun. 27, 2016, now Pat. No. 9,774,579.

(Continued)

(51) Int. Cl.
*H04L 9/32* (2006.01)
*H04L 29/06* (2006.01)
(Continued)

(52) U.S. Cl.
CPC .......... *H04L 63/068* (2013.01); *H04L 9/0863* (2013.01); *H04L 9/14* (2013.01);
(Continued)

(58) Field of Classification Search
None
See application file for complete search history.

(56) References Cited

U.S. PATENT DOCUMENTS 5,838,792 A 11/1998 Ganesan
5,870,723 A 2/1999 Pare, Jr. et al.
(Continued)

FOREIGN PATENT DOCUMENTS

EP 2639997 9/2013

OTHER PUBLICATIONS

Edge, Kenneth, et al. "The use of attack and protection trees to analyze security for an online banking system." System Sciences, 2007. HICSS 2007. 40th Annual Hawaii International Conference on. IEEE, 2007.
(Continued)

*Primary Examiner* — Brandon S Hoffman
(74) *Attorney, Agent, or Firm* — Jeffrey Schox; Padowithz Alce

(57) ABSTRACT

A method for key rotation includes initiating key rotation for a user account of a multi-factor authentication platform enabling one-time password authentication using a first symmetric cryptographic key; generating, at an authenticating device, a second symmetric cryptographic key; transmitting, at the authenticating device, the second symmetric cryptographic key to the multi-factor authentication platform; configuring the multi-factor authentication platform and the authenticating device to disable authentication that uses the first symmetric cryptographic key; and configuring the multi-factor authentication platform and the authenticating device to enable authentication that uses the second symmetric cryptographic key.

14 Claims, 4 Drawing Sheets

Related U.S. Application Data

(60) Provisional application No. 62/197,316, filed on Jul. 27, 2015.

(51) Int. Cl.
  *H04L 9/08* (2006.01)
  *H04L 9/30* (2006.01)
  *H04L 9/14* (2006.01)

(52) U.S. Cl.
  CPC .............. *H04L 9/30* (2013.01); *H04L 63/083* (2013.01); *H04L 2463/082* (2013.01)

(56) References Cited

U.S. PATENT DOCUMENTS

| | | |
|---|---|---|
| 6,119,096 A | 9/2000 | Mann et al. |
| 6,209,091 B1 | 3/2001 | Sudia et al. |
| 6,311,272 B1 | 10/2001 | Gressel |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 6,996,716 B1 | 2/2006 | Hsu |
| 7,000,247 B2 | 2/2006 | Banzhof |
| 7,093,133 B2 | 8/2006 | Hopkins et al. |
| 7,096,354 B2 | 8/2006 | Wheeler et al. |
| 7,107,246 B2 | 9/2006 | Wang |
| 7,146,009 B2 | 12/2006 | Andivahis et al. |
| 7,172,115 B2 | 2/2007 | Lauden |
| 7,331,518 B2 | 2/2008 | Rable |
| 7,334,255 B2 | 2/2008 | Lin et al. |
| 7,340,600 B1 | 3/2008 | Corella |
| 7,386,720 B2 | 6/2008 | Sandhu et al. |
| 7,447,784 B2 | 11/2008 | Eun |
| 7,463,637 B2 | 12/2008 | Bou-Diab et al. |
| 7,496,662 B1 | 2/2009 | Roesch et al. |
| 7,526,792 B2 | 4/2009 | Ross |
| 7,562,382 B2 | 7/2009 | Hinton et al. |
| 7,562,385 B2 | 7/2009 | Thione et al. |
| 7,571,471 B2 | 8/2009 | Sandhu et al. |
| 7,574,733 B2 | 8/2009 | Woodhill |
| 7,599,493 B2 | 10/2009 | Sandhu et al. |
| 7,630,493 B2 | 12/2009 | Sandhu et al. |
| 7,711,122 B2 | 5/2010 | Allen et al. |
| 7,716,240 B2 | 5/2010 | Lim |
| 7,764,970 B2 | 7/2010 | Neil et al. |
| 7,793,110 B2 | 9/2010 | Durfee et al. |
| 7,836,501 B2 | 11/2010 | Sobel et al. |
| 7,953,979 B2 | 5/2011 | Borneman et al. |
| 7,958,362 B2 | 6/2011 | Hwang |
| 7,961,645 B2 | 6/2011 | Gudipudi et al. |
| 7,982,595 B2 | 7/2011 | Hanna et al. |
| 7,983,987 B2 | 7/2011 | Kranzley et al. |
| 8,010,779 B2 | 8/2011 | Sermersheim et al. |
| 8,028,329 B2 | 9/2011 | Whitcomb |
| 8,099,368 B2 | 1/2012 | Coulter et al. |
| 8,136,148 B1 | 3/2012 | Chayanam et al. |
| 8,141,146 B2 | 3/2012 | Ozeki |
| 8,151,333 B2 | 4/2012 | Zhu et al. |
| 8,161,527 B2 | 4/2012 | Curren |
| 8,185,744 B2 | 5/2012 | Brown et al. |
| 8,200,980 B1 | 6/2012 | Robinson et al. |
| 8,225,392 B2 | 7/2012 | Dubrovsky et al. |
| 8,245,044 B2 | 8/2012 | Kang |
| 8,259,947 B2 | 9/2012 | Rose et al. |
| 8,332,627 B1 | 12/2012 | Matthews et al. |
| 8,335,933 B2 | 12/2012 | Humphrey et al. |
| 8,340,287 B2 | 12/2012 | Sandhu et al. |
| 8,340,635 B2 | 12/2012 | Herz et al. |
| 8,380,192 B2 | 2/2013 | Kim et al. |
| 8,381,297 B2 | 2/2013 | Touboul |
| 8,397,301 B2 | 3/2013 | Hering et al. |
| 8,402,526 B2 | 3/2013 | Ahn |
| 8,418,168 B2 | 4/2013 | Tyhurst et al. |
| 8,458,798 B2 | 6/2013 | Williams et al. |
| 8,484,708 B2 | 7/2013 | Chern |
| 8,495,720 B2 | 7/2013 | Counterman |
| 8,499,149 B2 | 7/2013 | Chen |
| 8,499,339 B2 | 7/2013 | Chao et al. |
| 8,510,820 B2 | 8/2013 | Oberheide et al. |
| 8,522,010 B2 | 8/2013 | Ozzie et al. |
| 8,528,039 B2 | 9/2013 | Chakarapani |
| 8,538,028 B2 | 9/2013 | Yeap et al. |
| 8,539,544 B2 | 9/2013 | Garimella et al. |
| 8,539,567 B1 | 9/2013 | Logue et al. |
| 8,548,426 B2 | 10/2013 | Smith |
| 8,571,220 B2 | 10/2013 | Ollikainen et al. |
| 8,578,162 B2 | 11/2013 | Jentzsch et al. |
| 8,595,822 B2 | 11/2013 | Schrecker et al. |
| 8,601,554 B2 | 12/2013 | Gordon et al. |
| 8,612,305 B2 | 12/2013 | Dominguez et al. |
| 8,627,438 B1 | 1/2014 | Bhimanaik |
| 8,646,060 B1 | 2/2014 | Ben Ayed |
| 8,646,086 B2 | 2/2014 | Chakra et al. |
| 8,667,288 B2 | 3/2014 | Yavuz |
| 8,689,287 B2 | 4/2014 | Bohmer et al. |
| 8,700,729 B2 | 4/2014 | Dua |
| 8,713,329 B2 | 4/2014 | Schneider |
| 8,713,639 B2 | 4/2014 | Cheeniyil et al. |
| 8,719,930 B2 | 5/2014 | Lapsley et al. |
| 8,732,475 B2 | 5/2014 | Fahrny et al. |
| 8,732,839 B2 | 5/2014 | Hohl |
| 8,737,623 B2 | 5/2014 | Hart |
| 8,745,703 B2 | 6/2014 | Lambert et al. |
| 8,751,801 B2 | 6/2014 | Harris et al. |
| 8,756,567 B2 | 6/2014 | Jentsch et al. |
| 8,756,651 B2 | 6/2014 | Baer et al. |
| 8,756,698 B2 | 6/2014 | Sidagni |
| 8,763,077 B2 | 6/2014 | Oberheide et al. |
| 8,806,609 B2 | 8/2014 | Gladstone et al. |
| 8,850,516 B1 | 9/2014 | Hrebicek et al. |
| 8,862,097 B2 | 10/2014 | Brand et al. |
| 8,891,772 B2 | 11/2014 | D Souza et al. |
| 8,893,230 B2 | 11/2014 | Oberheide et al. |
| 8,898,762 B2 | 11/2014 | Kang |
| 8,949,596 B2 | 2/2015 | Yin et al. |
| 8,949,927 B2 | 2/2015 | Arnott et al. |
| 8,966,587 B2 | 2/2015 | Nair et al. |
| 8,984,276 B2 | 3/2015 | Benson et al. |
| 9,037,127 B2 | 5/2015 | Raleigh |
| 9,049,011 B1 | 6/2015 | Agrawal |
| 9,049,594 B2 | 6/2015 | Chen et al. |
| 9,071,611 B2 | 6/2015 | Yadav et al. |
| 9,076,343 B2 | 7/2015 | Chaar et al. |
| 9,110,754 B2 | 8/2015 | Poonamalli et al. |
| 9,118,656 B2 | 8/2015 | Ting et al. |
| 9,122,888 B2 | 9/2015 | Devi |
| 9,124,582 B2 | 9/2015 | Kalinichenko et al. |
| 9,135,458 B1 | 9/2015 | Hankins, Jr. et al. |
| 9,154,387 B2 | 10/2015 | Maki et al. |
| 9,189,491 B2 | 11/2015 | Fushman et al. |
| 9,201,644 B2 | 12/2015 | Klein et al. |
| 9,203,841 B2 | 12/2015 | Neuman et al. |
| 9,223,961 B1 | 12/2015 | Sokolov |
| 9,225,840 B2 | 12/2015 | Malatack et al. |
| 9,253,185 B2 | 2/2016 | Alaranta et al. |
| 9,258,296 B2 | 2/2016 | Juthani |
| 9,282,085 B2 | 3/2016 | Oberheide et al. |
| 9,338,156 B2 | 5/2016 | Oberheide et al. |
| 9,338,163 B2 | 5/2016 | Wendling et al. |
| 9,386,003 B2 | 7/2016 | Kumar |
| 9,391,980 B1 | 7/2016 | Krahn et al. |
| 9,430,938 B2 | 8/2016 | Proud |
| 9,443,084 B2 | 9/2016 | Nice et al. |
| 9,479,509 B2 | 10/2016 | Zeuthen |
| 9,659,160 B2 | 5/2017 | Ligatti et al. |
| 9,668,137 B2 | 5/2017 | Sigurdson et al. |
| 9,706,410 B2 | 7/2017 | Sreenivas et al. |
| 2002/0013898 A1 | 1/2002 | Sudia et al. |
| 2002/0136410 A1 | 9/2002 | Hanna |
| 2003/0061506 A1 | 3/2003 | Cooper et al. |
| 2003/0115452 A1 | 6/2003 | Sandhu et al. |
| 2004/0139312 A1 | 7/2004 | Medvinsky |

(56) References Cited

U.S. PATENT DOCUMENTS

| | | |
|---|---|---|
| 2006/0031938 A1 | 2/2006 | Choi |
| 2006/0059569 A1 | 3/2006 | Dasgupta et al. |
| 2007/0250914 A1 | 10/2007 | Fazal et al. |
| 2007/0284429 A1 | 12/2007 | Beeman |
| 2007/0297607 A1 | 12/2007 | Ogura et al. |
| 2008/0120411 A1 | 5/2008 | Eberle |
| 2008/0229104 A1 | 9/2008 | Ju et al. |
| 2009/0055906 A1 | 2/2009 | Von Wendorff |
| 2009/0167489 A1 | 7/2009 | Nan et al. |
| 2009/0271863 A1 | 10/2009 | Govindavajhala et al. |
| 2010/0023781 A1 | 1/2010 | Nakamoto |
| 2010/0042954 A1 | 2/2010 | Rosenblatt et al. |
| 2010/0180001 A1 | 7/2010 | Hardt |
| 2010/0274859 A1 | 10/2010 | Bucuk |
| 2011/0026716 A1 | 2/2011 | Tang et al. |
| 2011/0138469 A1 | 6/2011 | Ye et al. |
| 2011/0197267 A1 | 8/2011 | Gravel et al. |
| 2011/0219449 A1 | 9/2011 | St Neitzel et al. |
| 2011/0302410 A1 | 12/2011 | Clarke et al. |
| 2012/0096274 A1 | 4/2012 | Campagna et al. |
| 2012/0227098 A1 | 9/2012 | Obasanjo et al. |
| 2013/0060708 A1 | 3/2013 | Oskolkov et al. |
| 2013/0110676 A1 | 5/2013 | Kobres |
| 2013/0125226 A1 | 5/2013 | Shah et al. |
| 2013/0239168 A1 | 9/2013 | Sreenivas et al. |
| 2013/0246281 A1 | 9/2013 | Yamada et al. |
| 2014/0177842 A1 | 6/2014 | Yellepeddy et al. |
| 2014/0201841 A1 | 7/2014 | Deshpande et al. |
| 2014/0208405 A1 | 7/2014 | Hashai |
| 2014/0244993 A1 | 8/2014 | Chew |
| 2014/0245278 A1 | 8/2014 | Zellen |
| 2014/0351954 A1 | 11/2014 | Brownell et al. |
| 2015/0242643 A1* | 8/2015 | Hankins, Jr. ............ H04L 63/04 726/26 |
| 2016/0056962 A1 | 2/2016 | Mehtälä |
| 2016/0164866 A1 | 6/2016 | Oberheide et al. |
| 2016/0286391 A1* | 9/2016 | Khan .................... G06Q 20/322 |

OTHER PUBLICATIONS

Goldfeder et al., Securing Bitcoin wallets via a new DSA/ECDSA threshold signature scheme, http://www.cs.princeton.edu/~stevenag/threshold_sigs.pdf, 2015.

Neuenhofen, Kay, and Mathew Thompson. "A secure marketplace for mobile java agents." Proceeding of the second international Conference on Autonomous agents. ACM, 1998. (pp. 212-218).

Simske et al., "APEX: Automated Policy Enforcement eXchange", Sep. 21-24, 2010, ACM, pp. 139-142.

Symantec, Administration guide for symantec Endpoint protection and symantec network access control, 2009, version 11.00.05.00.00.

Symantec, Administration Guide for Symantec TM Endpoint Protection and Symantec Network Access Control, Aug. 1, 2007.

* cited by examiner

METHOD FOR KEY ROTATION

CROSS-REFERENCE TO RELATED APPLICATIONS

This application is a continuation of U.S. Pat. No. 9,774,579, filed 27 Jun. 2016, which claims the benefit of U.S. Provisional Application No. 62/197,316, filed 27 Jul. 2015, both of which are incorporated in their entireties by this reference.

TECHNICAL FIELD

This invention relates generally to the authentication field, and more specifically to a new and useful method for key rotation.

BACKGROUND

Passwords are easily phished, captured, replayed, or otherwise compromised. To address weaknesses in passwords, two-factor authentication was developed and now is commonly deployed by websites and companies. Most two-factor authentication systems operate by adding an additional security challenge after prompting a user for primary password-based authentication.

One model of two-factor authentication utilizes one-time passcodes (OTPs). In this model, the user employs an OTP-generating device to generate a short, user friendly passcode (usually 6 or 8 numeric digits) and then provides that passcode to the validating service (usually by typing it in to an input box).

The OTP-generating device and the validating server both share a secret and employ an algorithm that allows them to agree upon what passcode to expect. OATH HOTP and TOTP are two open standards for OTP-based authentication.

Due to the nature of OTP-based authentication standards, OTP authentication requires the use of symmetric cryptography; therefore, both the validating server and the OTP-generating device must store the same symmetric cryptographic key. Unfortunately, this means that if the validating server is compromised, every device capable of validating with the server is at risk. Thus, there is a need in the authentication field to create a new and useful method for key rotation. This invention provides such a new and useful method.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
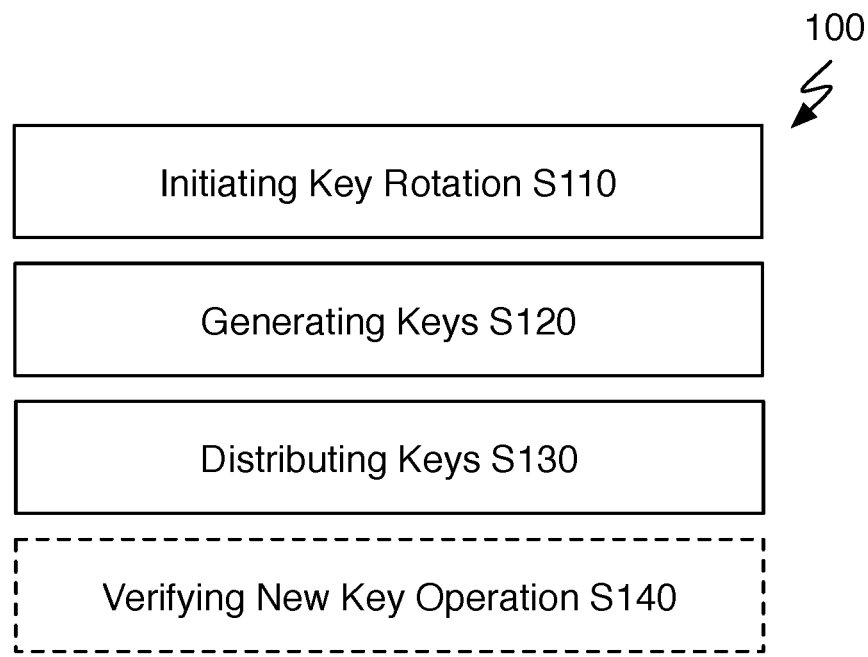
FIG. 1 is a chart view of a method of a preferred embodiment.

As shown in FIG. 1, a method 100 for key rotation includes: initiating key rotation S110, generating keys S120, and distributing keys S130. The method 100 may additionally or alternatively include verifying new key operation S140.

As described in the background section, while one-time passcode (OTP) authentication methods are commonly used to perform multi-factor authentication, they are vulnerable to authentication server attacks. This vulnerability arises from the need to maintain symmetric encryption; because the authentication server has the same key as the OTP-generating device (e.g., a smartphone), anyone with access to that key can authenticate as the user. In this scenario, while compromise of a user's OTP-generating device might expose only data and services accessible to that particular user, compromise of an authentication server can expose data and services for all OTP-generating devices capable of authenticating with the server. The result of this is potentially catastrophic.

Figure 2:
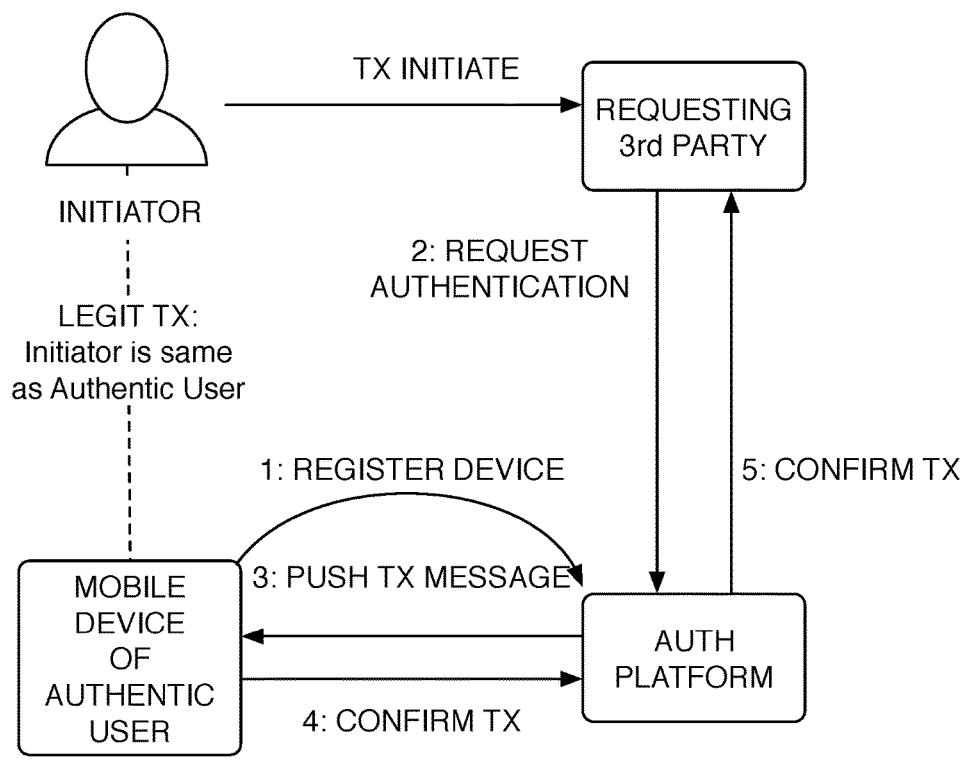
FIG. 2 is a communication flow diagram of a push authentication method.

Methods have been developed to address this issue; for example, the push authentication technique of U.S. patent application Ser. No. 13/039,209, the entirety of which has been incorporated by this reference. As shown in FIG. 2, this push authentication technique handles authentication by pushing an authentication request from an authentication platform to a registered device (Step 3). This authentication request is signed by a cryptographic key of the mobile device and transmitted back to the authentication platform (Step 4), where it is verified. One of the primary advantages of this authentication technique is that it may (and often does) use asymmetric cryptography. In this model, the private key is stored only on the authenticating device and not on the authentication server. If the authentication server is compromised, the attacker will only have access to the public keys, which are not sufficient to spoof or otherwise emulate device authentication.

While push authentication lacks the server-side vulnerability of OTP-based authentication, it still requires a device capable of receiving a push notification as well as a network connection to that device. In contrast, the shared secret of the OTP authentication algorithm may allow a user to authenticate, for example, by typing in a short numeric code displayed on an authenticating device (e.g., a smartphone, a hardware security token) into a login prompt manually. In some cases (e.g., when authenticating devices do not have network connectivity) users may need to authenticate using an OTP algorithm, despite the security vulnerabilities inherent in any OTP implementation.

Unfortunately, for a multi-factor authentication platform to be inclusive of OTP authentication, the platform must be exposed to at least some amount of risk of large-scale symmetric key compromise. The method 100 functions to mitigate that risk.

More specifically, the method 100 may function to mitigate the risk of large scale symmetric key compromise by enabling a multi-factor authentication platform to rapidly perform key rotation; thus, if a large number of symmetric keys are compromised, the method 100 can quickly enable those keys to be deactivated while minimizing disruption in service (by providing new keys).

This is a substantial departure from traditional methods for key rotation utilized for OTP authentication. Typically, TOTP (and other OTP applications) perform key rotation by requiring a user or administrator to enter a shared secret at an OTP application; this is typically displayed as a QR code and/or a numerical code at a computer accessed by a user, a user may take a picture of the QR code or enter the numerical code into the OTP application to establish the shared secret. These traditional methods suffer from a number of problems—as they are inherently manual, they can be very slow; further, this delay may cause either or both of extreme inconvenience and substantial security risks.

While the method 100 is particularly useful for the replacement of symmetric keys used in OTP authentication, the method 100 may also be used to replace asymmetric keys (such as those used for push authentication) in case of suspected compromise of a device. Alternatively, the method 100 may be used in any cryptographic key management scenario.

The method 100 is preferably implemented by a two-factor authentication system, but may additionally or alternatively be implemented with any multi-step and/or multi-factor authentication systems.

Note that while the authentication platform operating the method 100 preferably allows users to authenticate using either of OTP-based authentication and push-based authentication (or another asymmetric-encryption based auth. technique), the platform may in some cases only allow users to perform a particular authentication technique depending on authentication context. As a first example, a user may perform push auth for any authentication event, but may only perform OTP auth for low-security access (while push auth may be required for access to applications or data considered 'high-security'). As a second example, a user may perform OTP auth only if the user's authenticating device is not able to access the authentication platform via a network connection. As a third example, a user may only perform OTP auth if the user is attempting to access a service from a particular location (e.g., as determined via a GPS signal of the authenticating device, as determined via an IP address of a primary access point, etc.). As a fourth example, a user may only perform OTP auth only if OTP auth has been explicitly enabled for that user by a service provider or authentication platform administrator. In general, the types of authentication available may be modified or made conditionally available on any security or contextual data affecting authentication data. Further examples of such conditions may be found in U.S. Provisional Application No. 62/344,512, the entirety of which is incorporated by this reference.

The method 100 is preferably performed by an authenticating device (i.e., a device used as an authentication factor) and/or an authentication server, but may additionally or alternatively be performed by any suitable components of a two-factor or multi-factor authentication system. For example, the function of the authentication server may be distributed across a distributed computing network.

Authenticating devices are preferably network-connected (where network connected means at least able to communicate with the authentication server) mobile electronic devices capable of receiving push notifications (e.g., smartphones), but may additionally or alternatively be any suitable authenticating device capable of generating a one-time password. Examples of authenticating devices include desktop computers, servers, smartphones, tablets, laptops, media players, cameras, measurement devices, gaming systems, security tokens, vehicular computing devices, set-top boxes, and/or televisions.

S110 includes initiating key rotation. S110 functions to alert the authentication server and at least one authenticating device that one or more authentication keys need to be rotated (i.e., replaced).

S110 preferably includes receiving, at the authentication server and/or at an authenticating device, a key rotation request from an authentication system user or administrator. Key rotation requests preferably indicate the keys that need to be replaced (e.g., the symmetric key for device 1, the asymmetric key pair for device 2, etc.), but may additionally or alternatively include any suitable information. For example, a system administrator of a 2FA platform may request key rotation for all keys associated with a database of a compromised server.

Key rotation requests are preferably evaluated according to initiator privilege. For example, an authentication system user may be able to request only key rotation for his/her devices (alternatively, an authentication system user without additional privileges may not be able to make a key rotation request at all). As a second example, a system administrator for a company may be able to request key rotation for all devices associated with the company. As a third example, a system administrator for the authentication system may be able to request key rotation for any key associated with the system (or with a particular authentication server/database).

S110 may additionally or alternatively include receiving, at the authentication server and/or at an authenticating device, an automatically generated key rotation request (e.g., from a security server). For example, an automated security monitoring module may detect suspicious activity occurring with a large number of devices associated with symmetric keys accessible to the authentication server and automatically generate a key rotation request.

S110 may additionally or alternatively include initiating, at the authentication server and/or at an authenticating device, key rotation without receiving an external key rotation request. For example, S110 may include automatically initiating symmetric key rotation every three months (or every 25 logins) after initial key generation.

Figure 3:
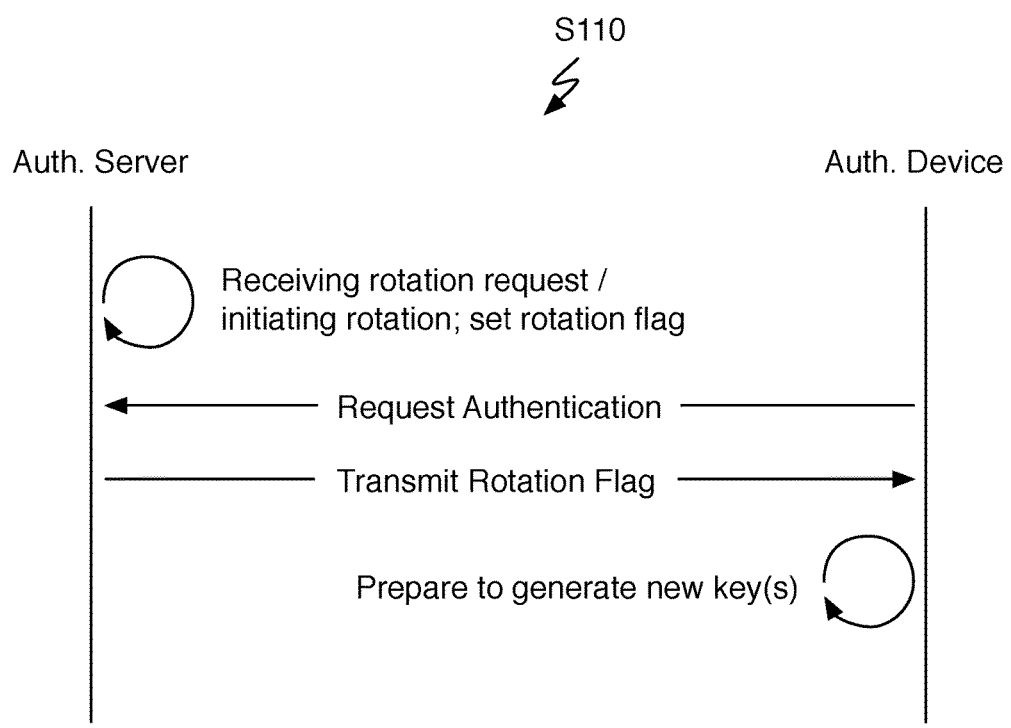
FIG. 3 is a communication flow diagram of authentication initiation of a method of a preferred embodiment.

S110 preferably includes initiating key rotation by setting a key rotation flag in an authentication server-side database and then transmitting that flag to the authenticating device, as shown in FIG. 3. Additionally or alternatively, key rotation may be initiated in any manner. Flag transmission preferably occurs at the next time the authenticating device communicates with the authentication server, but may additionally or alternatively occur at any time (e.g., the next time the authenticating device requests authentication).

Additionally or alternatively, key rotation flags may be set in any location accessible to the authentication server and/or the authenticating device.

If key rotation is initiated by the entity responsible for generating the new key(s), S110 may include proceeding to key generation (S120) before notifying the other entity that key rotation is to take place. For example, if key generation occurs on the authenticating device and key rotation is initiated by the authenticating device, the authenticating device may generate a key or key pair before notifying the authentication server that key rotation is requested.

If keys are generated before notification of both parties (i.e., authenticating device and authentication server), the key generating party may notify the other party of key rotation by sending the newly generated key (instead of a key rotation flag or other notification). Additionally or alternatively, the key generating party may first send a key rotation notification before transmitting the new key. If a key rotation notification is sent, the sending party may additionally or alternatively wait for confirmation before proceeding.

In a variation of a preferred embodiment, S110 may include attempting to verify, at one or both authenticating party, that key rotation requests are authentic (e.g., that an authentication device is not being spoofed) before requesting key generation. For example, S110 may include requesting additional information or analyzing operational data with behavioral heuristics. Authenticity may be verified against a database of known authentication factors or an authentication algorithm; additionally or alternatively, authenticity may be verified in any suitable manner. For example, if a device has been previously authenticated, S110 may include recognizing a cookie or other token of previous authentication.

S120 includes generating keys. S120 functions to generate keys in response to a key rotation request. S120 preferably includes generating keys at the authenticating device, but may additionally or alternatively include generating keys at the authentication server or any other entity.

S120 preferably includes generating keys according to a particular specification in a key rotation request (i.e., the key rotation request specifies the keys to be generated). Additionally or alternatively, S120 may generate keys according to a default setting (e.g., all keys used by a particular authenticating device, all symmetric keys contained on an authentication server, etc.) or based on any other criteria.

S120 preferably may generate keys using algorithms intended for asymmetric-key cryptography algorithms (e.g., RSA) as well as key generation algorithms intended for symmetric-key cryptography (e.g., DES and AES), but may additionally or alternatively generate keys in any manner.

S120 preferably utilizes random number generators (RNGs) or pseudo-random number generators (PRNGs) in the key generation process. If a key generating entity has a hardware RNG, S120 preferably includes using this RNG, but may additionally or alternatively use any suitable RNG or PRNG. If a key generating entity does not have a dedicated RNG, but is capable of providing potential RNG sources (e.g., radio noise, thermal noise), the entity preferably uses the RNG sources to generate random numbers. S120 may include performing any suitable signal processing on RNG sources to extract random numbers, including the use of randomness extractors. If a key generating entity does not have access to RNG sources, S120 preferably includes generating pseudo-random numbers using a PRNG. The PRNG preferably runs on general purpose computing hardware of the electronic device (e.g., a main CPU), but may additionally or alternatively run on more specialized hardware (e.g., a GPU, or hardware dedicated to security functions). Additionally or alternatively, S120 may include receiving random numbers from an external source (e.g., from an internet-connected random number generator).

S120 preferably includes storing keys after key generation. Keys may be stored either temporarily or semi-permanently depending on intended use; for example, if an authenticating device generates both a symmetric key and an asymmetric key pair, the device may store both the symmetric key and the private key of the asymmetric key pair semi-permanently, while it may only store the public key of the asymmetric key pair until it has been successfully transmitted to the authentication server.

S130 includes distributing keys. S130 functions to distribute keys generated in S120 to the authentication server and authenticating devices.

S130 preferably includes transmitting keys from the authenticating device to the authentication server, but may additionally or alternatively include transmitting keys from any source to any destination.

If an asymmetric key pair was generated in S120 (e.g., for push authentication), S130 preferably includes transmitting the public key of the asymmetric key pair across the network (e.g., from the authenticating device to the authentication server). This prevents the private key from being exposed to the network. Additionally or alternatively, S130 may include transmitting the private key of the asymmetric key pair across the network (e.g., from the authentication server to the authenticating device). This alternative may be used if the authenticating device is not capable of generating an appropriate asymmetric key pair (e.g., if it does not have strong cryptography libraries, no source of random number generation, etc.).

If a symmetric key was generated in S120 (e.g., for OTP authentication), S130 preferably includes transmitting the symmetric key across the network (e.g., from the authenticating device to the authentication server). Additionally or alternatively, the method 100 may include cooperating between the authentication server and the authenticating device to jointly arrive at a shared symmetric key according to a secure key-exchange algorithm (e.g., Diffie-Hellman); this would combine elements of S120 and S130.

If the symmetric key is transmitted from the authentication server to the authenticating device, S130 may include encrypting the symmetric key before transmission with the public key corresponding to a private key held by the authenticating device (it can then be decrypted by the authenticating device). This may be useful if the symmetric key and/or public key were potentially compromised (e.g., via server exploit), but not the private key.

If keys are transmitted from the authenticating device to the authentication server, S130 preferably includes signing the key transmission using the private key of the authenticating device. Note that the signing private key referenced here is the one corresponding to a public key held by the authentication server before key transmission; that is, if a new asymmetric key pair is transmitted, the transmission is signed by the old private key (as opposed to the new one). Additionally or alternatively, S130 may include signing the key transmission (or otherwise providing evidence of authenticity) in any suitable manner.

If keys are transmitted from the authentication server to the authenticating device, S130 preferably includes signing the key transmission using the public key of the authentication server. Note that the signing public key referenced here is the one corresponding to a private key held by the authenticating device before key transmission; that is, if a new asymmetric key pair is transmitted, the transmission is signed by the old public key (as opposed to the new one). Additionally or alternatively, S130 may include signing the key transmission (or otherwise providing evidence of authenticity) in any suitable manner.

If the authenticating device and authentication server do not already share an asymmetric key pair, the key transmission may be signed using the symmetric key (or may be accompanied by a set of one-time passwords generated by the symmetric key). Additionally or alternatively, the authentication server (and/or auth. device) may use heuristics or an identification algorithm to authenticate the transmission. For example, an authentication server may choose to accept a key transmission from an authenticating device if the key transmission originates from a user and IP address frequently associated with that authenticating device in the past. S130 may include attempting to authenticate or verify a key transmission in any manner.

After key transmission, S130 preferably includes configuring the authenticating device and authentication server to use newly generated keys and disposing of old keys and/or temporarily stored keys (e.g., a public key stored on the authenticating device). Additionally or alternatively, S130 may include waiting until conclusion of key pair operation verification (S140) to reconfigure authentication and/or dispose of keys. Note that key operation may be reconfigured in any manner; for example, there may be a grace period (e.g., old keys are allowed to be used for a certain period of time after key rotation is initiated; old keys may be used for low-security access; or a combination of the two).

S140 includes verifying new key operation. S140 functions to confirm that a new authentication configuration (e.g., new keys) is operating correctly. S140 preferably includes receiving a follow-up request signed with newly distributed keys or other confirmation. For example, S140 may include receiving a message signed with a new symmetric key at the authenticating device after transmitting a new symmetric key from the authenticating device to the authentication server. S140 may additionally or alternatively include verifying new key operation in any manner.

As discussed in S130, verification under S140 may include prompting configuration changes (e.g., configure auth. system to use new keys if verified successfully, falling back to old keys/initiating a new keygen process if not) and/or key disposal (e.g., removing old keys and/or temporarily stored keys).

Figure 4:
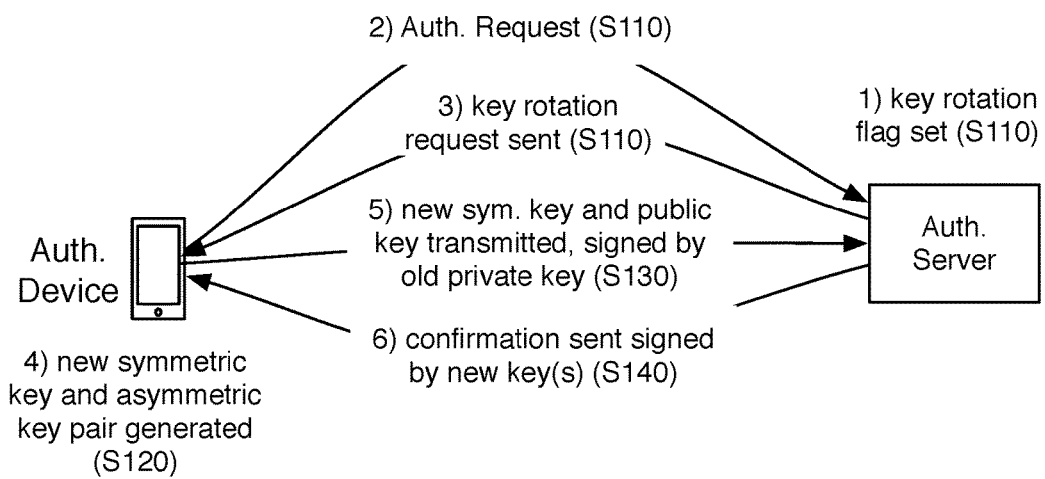
FIG. 4 is an example communication flow diagram of a method of a preferred embodiment.

An example implementation of the method 100 is as shown in FIG. 4.

The method of the preferred embodiment and variations thereof can be embodied and/or implemented at least in part as a machine configured to receive a computer-readable medium storing computer-readable instructions. The instructions are preferably executed by computer-executable components preferably integrated with a multi-factor authentication service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method for cryptographic key rotation, the method comprising:
   providing a cryptographic key rotation request to a client device to implement a cryptographic key rotation between the client device and a remote computing server, wherein the cryptographic key rotation causes the client device to generate one or more new cryptographic keys that are used to replace one or more pre-existing cryptographic keys stored at the client device and the remote computing server;
   in response to receiving the key rotation request, generating a new asymmetric cryptographic key pair comprising a new private cryptographic key and a new public cryptographic key defining a public/private cryptographic key pair;
   generating, at the client device, a key rotation communication that includes the new public cryptographic key of the new asymmetric cryptographic key pair, wherein the client device maintains the new private cryptographic key and does not transmit the new private cryptographic key pair to the remote computing server;
   at the client device, using a pre-existing private cryptographic key of a pre-existing asymmetric cryptographic key pair to cryptographically sign the key rotation communication;
   transmitting, via a network, to the remote computing server the cryptographically signed key rotation communication;
   completing the cryptographic key rotation, wherein the completing includes:
      (i) after transmitting the cryptographically signed key rotation communication, replacing, at the client device, the pre-existing private cryptographic key with the new private cryptographic key by ceasing a use of the pre-existing private cryptographic key in future communications with the remote computing server; and
      (ii) after receiving, at the remote computing server, the cryptographically signed key rotation communication, decrypting by the remote computing server the cryptographically signed key rotation communication with a pre-existing public cryptographic key of the pre-existing asymmetric cryptographic key pair, replacing the pre-existing public cryptographic key with the new public cryptographic obtained from the cryptographically signed key rotation communication, wherein the remote computing server uses the new public cryptographic key in the future communications with the client device.

2. The method of claim 1, wherein the remote computing server is implemented by a multi-factor authentication service that transmits secondary authentication requests to the device, wherein the client device uses the new private cryptographic key to cryptographically signs an authentication response to the secondary authentication prior to transmitting the authentication response to the multi-factor authentication service.

3. The method of claim 2, wherein:
   wherein the cryptographic key rotation request is generated at an automated security monitoring module in response to detection of suspicious activity associated with symmetric cryptographic keys accessible to the multi-factor authentication platform.

4. The method of claim 1, wherein the client device comprises a user device that uses a hardware random number generator or a hardware pseudo random number generator to generate the new asymmetric cryptographic key pair.

5. The method of claim 1, further comprising:
   in response to receiving the key rotation request, generating a new symmetric cryptographic key;
   generating, at the client device, the key rotation communication that includes the new public cryptographic key of the new asymmetric cryptographic key pair and the new symmetric key, wherein the client device maintains a copy of the new symmetric key; and
   at the client device, using the pre-existing private cryptographic key of the pre-existing asymmetric cryptographic key pair to cryptographically sign the key rotation communication; and
   transmitting, via the network, to the remote computing server the cryptographically signed key rotation communication that includes the new symmetric key.

6. The method of claim 5, further comprising:
   after the transmission of the cryptographically signed key rotation communication, replacing a pre-existing symmetric key at both the client device and the remote computing server and ceasing a use of the pre-existing symmetric.

7. The method of claim 6, wherein:
the client device participates in authentication by generating a one-time password using the new symmetric cryptographic key.

8. The method of claim 1, further comprising:
at the remote computing server, periodically generating key rotation requests that causes the client device to generate the one or more new cryptographic keys that are used to replace the one or more pre-existing cryptographic keys stored at the client device and the remote computing server; and
periodically transmitting, by the remote computing server, the key rotation requests to the client device.

9. The method of claim 1, further comprising:
detecting a compromising event at the remote computing server, wherein the compromising event indicates that the pre-existing public cryptographic key at the remote computing server has been improperly compromised;
in response to detecting the comprising event, generating at the remote computing server the key rotation request; and
transmitting the key rotation request to the client device.

10. The method of claim 1, further comprising:
detecting a compromising event at the client device, wherein the compromising event indicates that the pre-existing private cryptographic key at the client device has been improperly compromised;
in response to detecting the comprising event, automatically generating at the client device the new asymmetric cryptographic key pair comprising the new private cryptographic key and the new public cryptographic key defining the public/private cryptographic key pair; and
transmitting, by the client device, to the remote computing server the new public cryptographic key.

11. The method of claim 1, wherein:
the key rotation request comprises a request to generate a new symmetric key for the client device and remote computing server; and
implementing a Diffie-Hellman cooperation between the client device and the remote computing device to generate a new shared symmetric cryptographic key, wherein Diffie-Hellman comprises a secure cryptographic key-exchange process that does not require a transmission of the new shared symmetric cryptographic key, wherein in response to generating the new shared symmetric cryptographic key, disabling a pre-existing symmetric cryptographic key at both the client device and the remote computing device.

12. The method of claim 1, wherein:
the client device comprises an authentication device of a user, wherein using the authentication device is enabled to perform a multi-factor authentication in response to an authentication request from the remote computing server, and
after the cryptographic key rotation, the authentication device performs multi-factor authentication using the new private cryptographic key to cryptographically sign one or more authentication responses to one or more authentication requests from the remote computing server.

13. The method of claim 1, wherein:
the remote computing server is implemented by a multi-factor authentication service;
a service provider using the multifactor authentication service generates the cryptographic key rotation request; and
in response to generating the cryptographic key rotation request, transmitting the cryptographic key rotation request to the multifactor authentication service or the client device.

14. A method for key rotation comprising:
initiating cryptographic key rotation for a user account of a multi-factor authentication platform, wherein an authenticating device participates in authentication with the multi-factor authentication platform by generating an authentication response to an authentication request and signing the authenticating response using a first private cryptographic key of a first asymmetric key set, wherein the first asymmetric key set includes the first private cryptographic key that is stored by the authenticating device and a first public cryptographic key that is stored by the multi-factor authentication platform;
in response to initiating the cryptographic key rotation, generating, at the authenticating device, a second symmetric cryptographic key;
signing, at the authenticating device, the second symmetric cryptographic key with the first private cryptographic key;
transmitting, by the authenticating device, the signed second symmetric cryptographic key to the multi-factor authentication platform;
configuring the multi-factor authentication platform and the authenticating device to:
(i) disable authentication that uses a first symmetric cryptographic key; and
(ii) enable authentication that uses the second symmetric cryptographic key.

\* \* \* \* \*